(No Model.)
T. J. BAKER.
BOILER SCRAPER.
No. 473,809. Patented Apr. 26, 1892.
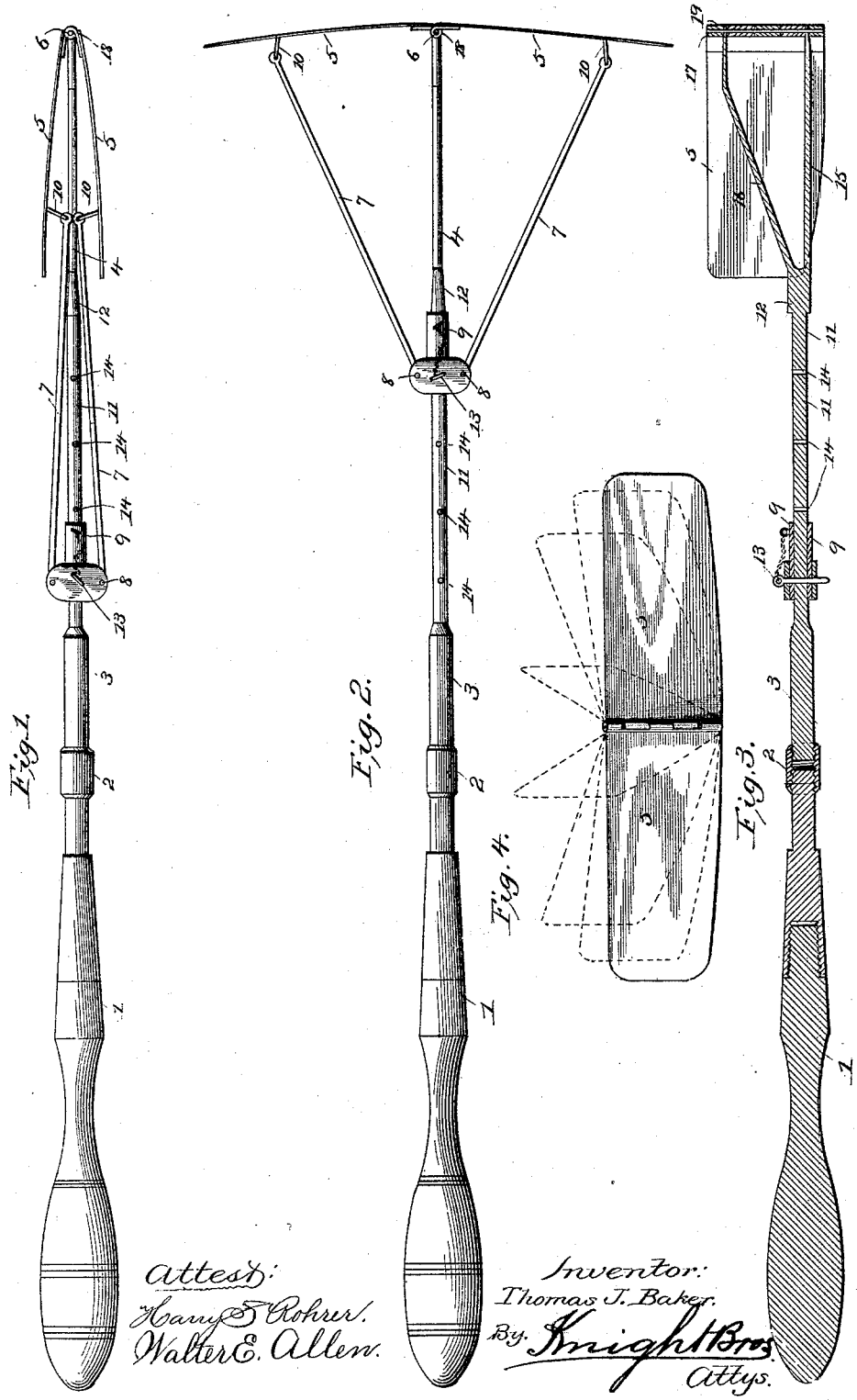
Attest:
Harry S. Rohrer.
Walter E. Allen.
Inventor:
Thomas J. Baker.
By Knight Bros
Attys.

UNITED STATES PATENT OFFICE.

THOMAS J. BAKER, OF FINDLAY, OHIO.

BOILER-SCRAPER.

SPECIFICATION forming part of Letters Patent No. 473,809, dated April 26, 1892.

Application filed October 24, 1891. Serial No. 409,680. (No model.)

*To all whom it may concern:*

Be it known that I, THOMAS J. BAKER, a citizen of the United States, residing at Findlay, in the county of Hancock and State of Ohio, have invented certain new and useful Improvements in Boiler-Scrapers, of which the following is a specification.

My invention relates to a device adapted to be folded for insertion through a hand-hole in a boiler and then spread or extended for the purpose of covering a large area with its scraping-edge for the purpose of removing matter of incrustation.

My invention consists in the device hereinafter described, and which will be understood upon reference to the accompanying drawings, in which—

Figure I is a plan of my improved device in its folded position. Fig. II is a similar view of my device in its spread position. Fig. III is a longitudinal vertical section through the hinge, and Fig. IV is a diagrammatic view illustrating the adaptability of my device to curved surfaces formed in arcs of different circles.

1 represents the handle, which may be of any convenient form or size. 2 represents a screw-sleeve, by which the handle is united to the shank 3 of the device. The device is further provided with the central rod 4, on the outer ends of which wings 5 are hinged at 6. The device is further provided with the spreading-arms 7, which have bearings 8 in the sleeve 9 and are hinged at their forward ends to staples 10, projecting from the inner faces of the wings 5. The sleeve 9 is adapted to slide on the squared portions 11 of the central rod 4. The said central rod is provided with the stop 12, which limits the forward movement of the sliding sleeve. The length of the arms 7 and the location of the stop 12 are such that the sleeve will be against said stop when the wings 5 have been forced out, so as to lie in a line substantially at right angles to the stem or rod 4. In order to secure the wings at any position—that is to say, at any angle to the central stem or rod—the sleeve 9 is provided with a pin 13, which is adapted to enter corresponding perforations 14 in said stem.

By referring to Fig. III it will be seen that in hinging the wings 5 to the stem 4 said stem is bifurcated so as to form arms 15 16, and said arms are perforated, so that a pin 17 may pass down through sockets 18, formed in the respective wings and perforations in said ends 15 16, said sockets in the wings being cut away to admit said ends. It will thus be seen that the wings are readily hinged to the ends of the bifurcated stem without the necessity of provision of any special bearing for said ends and without leaving the ends on the outside edge of the scraper to operate as an obstruction in the act of scraping.

Referring to Fig. IV it will be seen that even when the wings are in their extended position their bottom or scraping edge is formed in the arc of a very large circle, so that the construction is adapted for use on a curved surface. Moreover, by changing the angle which the wings make with each other, as shown in dotted lines, the scraping-edge may readily be adapted to variously different curvatures in the boiler. It will thus be seen that I have constructed a boiler-scraper well adapted for insertion through a very small hand-hole, but at the same time adapted for thoroughly scraping the inner surface of the boiler, taking in more or less boiler-surface, according to the curvature of the same.

Having thus described my invention, the following is what I claim as new therein and desire to secure by Letters Patent:

1. In a boiler-scraper, the combination of the stem, the wings hinged to the stem and adapted for folding thereon, and means attached to the wings for moving them in either direction and adjustably connected with the stem for fixing said wings at any angle to the stem, as and for the purpose set forth.

2. In a boiler-scraper, the combination of the stem, the wings hinged at one end of the stem, the sleeve moving upon the stem, and connection between said movable sleeve and said wings for moving them in either direction, substantially as and for the purpose set forth.

3. In a boiler-scraper, the combination of the stem, the wings hinged at their inner ends to the end of the stem and adapted to fold upon the sides of said stem, the sleeve arranged to slide upon said stem, the locking device carried by said sleeve, and the rods or arms hinged to said sleeve and to said wings at or near the outer ends.

4. In a boiler-scraper, the combination of the stem, the wings hinged to said stem, and means for locking said wings at any angle to the stem, consisting of the sleeve on the stem, links connecting the sleeve and wings together, and perforations in the sleeve and stem for the reception of a pin for locking them in different relative positions, substantially as and for the purpose set forth.

5. In a boiler-scraper, the combination, with a suitable stem, of a pair of wings hinged to one end of said stem and having their lower edges formed in the arc of a circle, and means carried by a sleeve on said stem and the links connected to the sleeve and to the wings for securing the wings at any angle to the stem, substantially in the manner and for the purpose set forth.

6. In a boiler-scraper, the combination of the stem, the sleeve sliding upon said stem, stops upon said stem for limiting the inner and outer movement of said sleeve, the hinged wings carried by said stem, connection between the outer ends of said wings and the sliding sleeve, and the handle detachably secured to said stem, substantially as and for the purpose set forth.

THOMAS J. $\overset{\text{his}}{\times}$ BAKER.
mark

Witnesses:
THEO. TOTTEN,
NELLIE HALL.